US012363019B2

(12) United States Patent
Littlejohn et al.

(10) Patent No.: US 12,363,019 B2
(45) Date of Patent: *Jul. 15, 2025

(54) SYSTEMS AND METHODS FOR INTELLIGENT APPLICATION GROUPING (71) Applicant: RISC Networks, LLC, Asheville, NC (US)

(72) Inventors: Jeremy Littlejohn, Fairview, NC (US); Greg Watts, Nottingham, NH (US)

(73) Assignee: RISC Networks, LLC, Asheville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,140

(22) Filed: Aug. 25, 2023

(65) Prior Publication Data
US 2024/0171525 A1   May 23, 2024

Related U.S. Application Data (63) Continuation of application No. 17/586,051, filed on Jan. 27, 2022, now Pat. No. 11,743,206, which is a (Continued)

(51) Int. Cl.
*H04L 43/12* (2022.01)
*H04L 41/14* (2022.01)
(Continued)

(52) U.S. Cl.
CPC ............ *H04L 43/12* (2013.01); *H04L 41/145* (2013.01); *H04L 43/062* (2013.01);
(Continued)

(58) Field of Classification Search
CPC ..... H04L 47/803; H04L 43/062; H04L 67/10; H04L 41/145; H04L 43/12
See application file for complete search history.

(56) References Cited

U.S. PATENT DOCUMENTS

| | | |
|---|---|---|
| 7,925,874 B1 | 4/2011 | Zaitsev |
| 9,231,833 B1 | 1/2016 | Bandopadhyay |

(Continued)

*Primary Examiner* — Michael A Keller
(74) *Attorney, Agent, or Firm* — Knobbe, Martens, Olson & Bear, LLP (57) ABSTRACT A method is described that comprises collecting communication data travelling among a plurality of computing nodes in a networked environment. The method includes using the communication data to create a plurality of connectivity records, wherein each connectivity record comprises a communication between a source computing node and a destination computing node of the plurality of computing nodes. The method includes associating the communication with an application context and protocol. The method includes processing the plurality of connectivity records to eliminate connectivity records that meet at least one criteria, wherein the plurality of connectivity records includes associated application contexts and protocols, wherein a first portion of the plurality of connectivity records comprises the eliminated connectivity records, wherein a second portion of the plurality of connectivity records comprises the remainder of the connectivity records. The method includes building a graph using the second portion of the connectivity records.

18 Claims, 9 Drawing Sheets

Related U.S. Application Data continuation of application No. 16/889,545, filed on Jun. 1, 2020, now Pat. No. 11,240,174, which is a continuation of application No. 16/239,761, filed on Jan. 4, 2019, now Pat. No. 10,680,973, which is a continuation of application No. 15/223,864, filed on Jul. 29, 2016, now Pat. No. 10,193,824, which is a continuation-in-part of application No. 14/846,791, filed on Sep. 6, 2015, now abandoned.

(51) Int. Cl.
*H04L 43/062* (2022.01)
*H04L 47/80* (2022.01)
*H04L 67/10* (2022.01)
*H04L 69/32* (2022.01)

(52) U.S. Cl.
CPC ............ *H04L 47/803* (2013.01); *H04L 67/10* (2013.01); *H04L 69/32* (2013.01)

(56) References Cited

U.S. PATENT DOCUMENTS

| | | |
|---|---|---|
| 10,193,824 B2 | 1/2019 | Littlejohn et al. |
| 2002/0095454 A1 | 7/2002 | Reed et al. |
| 2007/0061495 A1 | 3/2007 | Cummins et al. |
| 2009/0295798 A1 | 12/2009 | Goel |
| 2010/0067400 A1 | 3/2010 | Dolganow et al. |
| 2010/0328311 A1 | 12/2010 | Lakshmanan et al. |
| 2012/0271806 A1* | 10/2012 | Ieong ............... G06F 16/9535 707/706 |
| 2012/0297089 A1 | 11/2012 | Carothers |
| 2013/0117847 A1 | 5/2013 | Friedman et al. |
| 2014/0068747 A1 | 3/2014 | Burchfield et al. |
| 2014/0108483 A1 | 4/2014 | Tarta et al. |
| 2014/0172782 A1* | 6/2014 | Schuenzel ............ H04L 67/62 707/609 |
| 2015/0304880 A1 | 10/2015 | Kotecha et al. |
| 2016/0028580 A1 | 1/2016 | Radivojevic et al. |
| 2017/0054643 A1 | 2/2017 | Fraser |
| 2017/0126564 A1* | 5/2017 | Mayya ............... H04L 63/0272 |

* cited by examiner

FIG. 1

| SourceIP | Dest IP | Sour ceLoc | Dest Loc | Protocol Name | SRC Process | SRC Application Context | SRC Instance | DEST Process | DEST Application context | DEST Instance | Max Kbps | Avg Kbps | Max RTT | Min RTT | Avg RTT | Count RTT |
|---|---|---|---|---|---|---|---|---|---|---|---|---|---|---|---|---|
| 10.0.0.1 | 192.168.10.30 | Dallas | Omaha | mysql | Mysqld.exe | Oracle MySQL | Database 1 | W3.exe | Microsoft IIS | Sharepoint App 1 | 500 | 100 | .200 | .180 | .190 | 5000 |

FIG. 2

| SubnetID | Subnet | Mask | StartingIP Integer | Ending IP Integer | Total Available |
|---|---|---|---|---|---|
| 4 | 192.168.10.0 | 255.255.255.0 | 3232238081 | 3232238335 | 254 |

FIG. 3

| LocationID | Location Name | RISC Defined |
|---|---|---|
| 12 | Amazon Cloud US East | 7 |

FIG. 4 (400, 410, 420, 430, 440)

| SubnetID | Subnet | Mask | Starting IP Integer | Ending IP Integer | Total Available | Location ID |
|---|---|---|---|---|---|---|
| 4 | 192.168.1.0 | 255.255.255.0 | 3232238081 | 3232238335 | 254 | 12 |

FIG. 4 (300, 310, 320, 330, 340, 350, 360, 370)

| SRC Process | SRC Application | SRC Application context | DEST Process | DEST Application | DEST Application Context |
|---|---|---|---|---|---|
| Chrome.exe | Google Chrome | Chrome Web Browser | apache | Apache | Apache Web Server |

SYSTEMS AND METHODS FOR INTELLIGENT APPLICATION GROUPING

CROSS REFERENCE TO RELATED APPLICATIONS

This application is a continuation of U.S. patent application Ser. No. 17/586,051, filed Jan. 27, 2022, which is a continuation of U.S. patent application Ser. No. 16/889,545, filed Jun. 1, 2020, which is a continuation of U.S. patent application Ser. No. 16/239,761, filed Jan. 4, 2019, which is a continuation of U.S. patent application Ser. No. 15/223,864, filed Jul. 29, 2016, which is a continuation in part application of U.S. patent application Ser. No. 14/846,791, filed Sep. 6, 2015, the contents of each of which are incorporated by reference herein in their entireties and made part of this specification.

BACKGROUND

The disclosure set forth herein presents systems and methods for analyzing enterprise network traffic under an embodiment.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

An enterprise network comprises an enterprise's communications backbone. The network connects computers and related devices across departments and workgroups and facilitates insight and data accessibility. An organization or enterprise may maintain hundreds of servers or compute nodes (CNs). Each server or CN may (either individually or in combination with other servers) run one or more applications. Organizations wish to deal with computing resources at the "application" level versus the CN level.

As indicated above, many CNs working together may run or provide a particular application. An application is a business level technology deliverable. For example, an organization my implement SAP applications. In general, SAP applications provide customers with the ability to interact with a common corporate database maintained with respect to a comprehensive range of business applications. As another example, an organization may implement ERP applications. Enterprise resource planning (ERP) is a category of business-management software—typically a suite of integrated applications—that an organization may use to collect, store, manage and interpret data from many business activities, including product planning, purchase manufacturing or service delivery, marketing and sales, inventory management, and shipping and payment. As another example, an organization may implement CRM applications. CRM software is a category of software that covers a broad set of applications and software designed to help businesses manage customer data and customer interaction, access business information, automate sales, marketing and customer support and also manage employee, vendor and partner relationships.

In a networked enterprise environment, thousands of CNs communicate with each other throughout any given time period. A problem arises in determining whether each such communication is important. Further, a problem arises in determining which CNs cooperate to provide any particular application in the enterprise environment. Tracking communications in an enterprise network produces an overabundance of data points. For example, one may "listen" to the incoming and outgoing communications of four CNs. These four CNs communicate with hundreds of other CNs which themselves communicate with hundreds of additional CNs. This type of network surveillance fails to identify which communications (involving the original 4 CNs) are related in a way that is meaningful to an organization.

Figure 1:
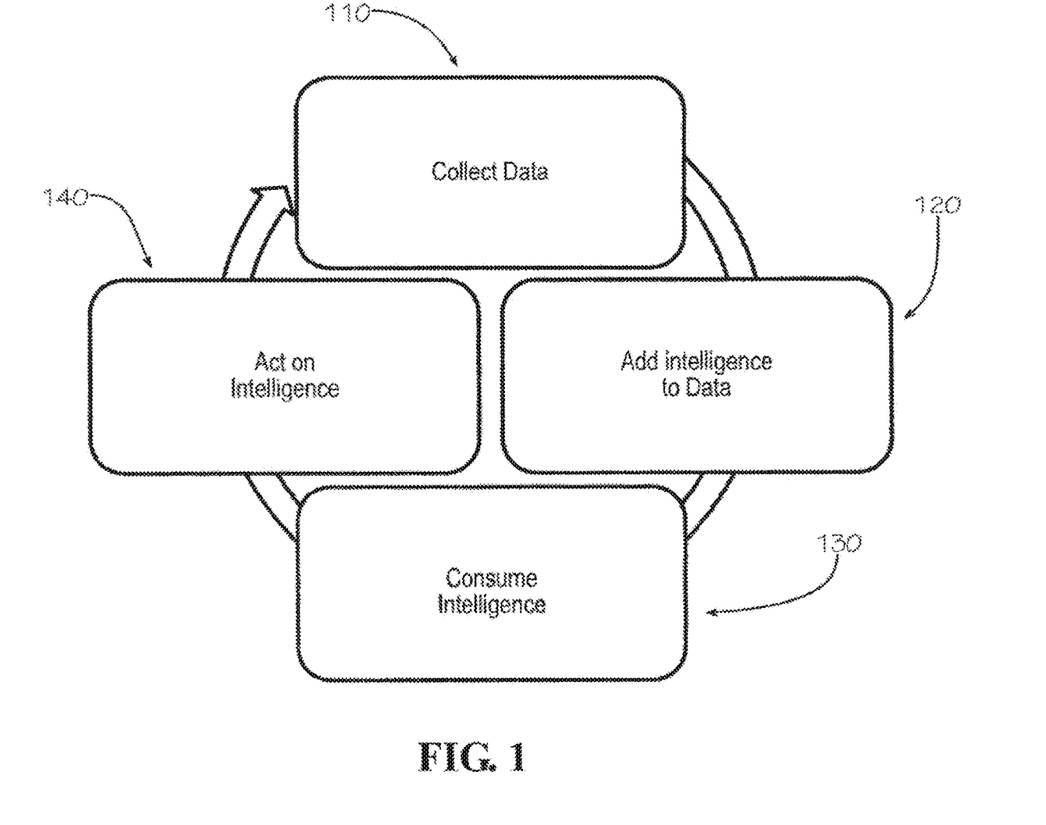
FIG. 1 shows steps of an intelligent application grouping, under an embodiment.

An intelligent application grouping approach analyzes network data in an enterprise environment to provide meaningful and actionable intelligence to an organization. FIG. 1 shows steps of an intelligent application grouping, under an embodiment. First, the intelligent application grouping approach collects data 110. Second, the intelligent application grouping approach adds intelligence to data 120. Third, the intelligent application grouping approach consumes the intelligence 130. Fourth, the intelligent application grouping approach acts on the intelligence 140.

Systems and methods of an intelligent application grouping approach collect data regarding which computing devices or CNs communicate with each other over time and the characteristics of such communications. The collected data with respect to communications between CNs comprises a Connectivity Record (CR).

A Connectivity Record includes information collected from one or more sources as described below. Embodiments are not limited to the sources described below. Further, CRs may comprise differing or additional information than the CR information described below.

A Connectivity Record may include TCP/UDP Socket level communications that are observed by running commands such as NetStat™. The network utility NetStat™ displays active TCP connections, ports on which a computer is listening, Ethernet statistics, the IP routing table, IPv4 statistics (for the IP, ICMP, TCP, and UDP protocols), and IPV6 statistics (for the IPV6, ICMPv6, TCP over IPv6, and UDP over IPv6 protocols). Used without parameters, NetStat displays active TCP connections.

A Connectivity Record may include flow based information obtained by either directly sniffing network packets or accepting input from other flow capture technologies such as Cisco™ NetFlow™.

A Connectivity Record may comprise a configuration defined communication. For example, a configuration file or database entry may define an application dependency. The data collection process may parse the configuration file or observe the db entry to discover the application dependency. For example, an application.conf file may define a Database connection to serverA.domain.com on TCP port 3306. While this connection may not be observed frequently, its definition in a configuration file makes it important.

A Connectivity Record may comprise an error log based communication definition. For example, one may see an error on ComputeNodeA that says "Failed to reach ComputeNodeB", and the intelligent application grouping analysis may assume that an unsuccessful attempt was made to communicate from ComputeNodeA to ComputeNodeA. This unsuccessful communication has been logged and can be used as a CR. Likely this connection is defined in a custom configuration file that was unknown to the evaluator.

A Connectivity Record may be based on behaviors that have manifested in the computing environments of third party networking environments, or that are defined by a manufacturer. For example, a Microsoft Sharepoint server must communicate to a database, so the intelligent grouping approach understands to look for this database connection.

A Connectivity Record may include communications that are application API defined. For example, an application API may ask a particular database server what CNs are connected to the server and what databases the CNs are using. For example, in a multi-tenant environment such as cloud computing, data may be moved around to different locations by the cloud provider and the location of data may be kept in centralized API. Querying the API is one way to obtain a CR for a particular application. Different API methods may provide additional information, such as the processes or protocols in use.

Figure 2:
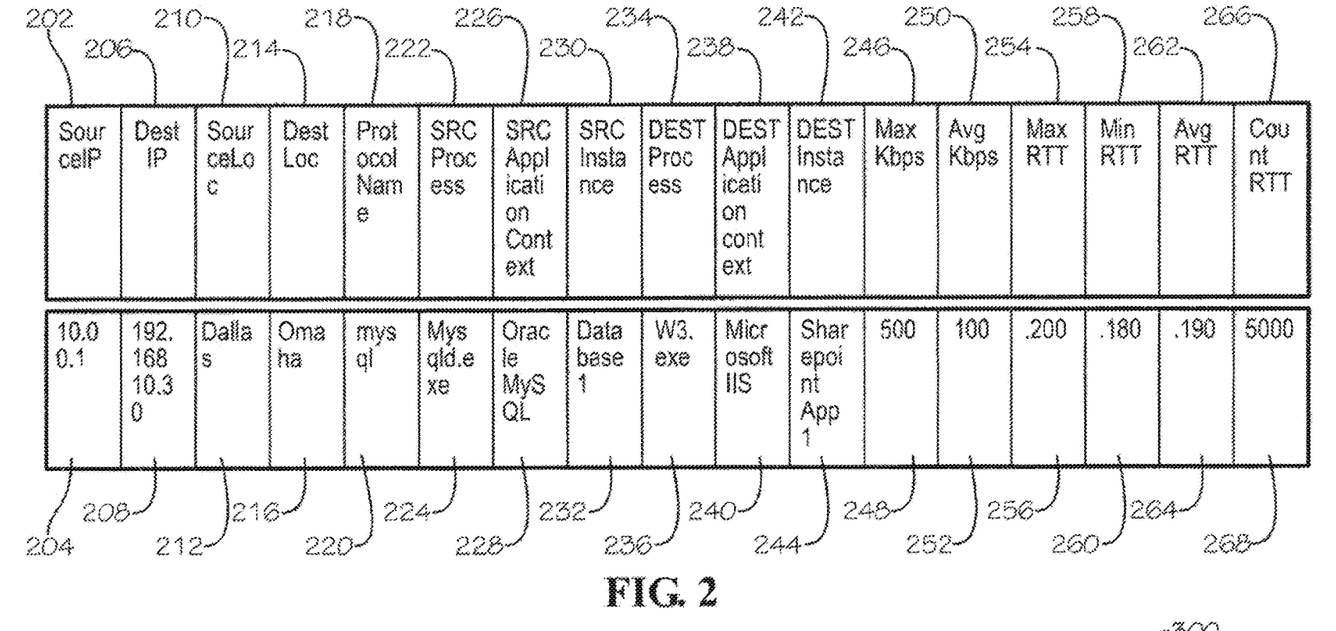
FIG. 2 shows an exemplary set of fields in an augmented connectivity record, under an embodiment.

Once data collected as indicated above, the data is normalized into a database. The database comprises a series of fields storing information about a network communication. FIG. 2 shows an exemplary set of fields. It should be noted that the model shown in FIG. 2 is simplified and may under alternative embodiments include an increased number of additional and/or differing fields. FIG. 2 shows the following field/value combinations: SourceIP (202)/10.0.0.1 (204); DestIP (206)/192.168.10.30 (208); SourceLoc (210)/Dallas (212); DestLoc (214)/Omaha (216); ProtocolName (218)/mysql (220); SRC Process (222)/Mysqld.exe (224); SRC Application Context (226)/Oracle MySQL (228); SRC Instance (230)/Database1 (232); DEST Process (234)/W3.exe (236); DEST Application Context (238)/Microsoft IIS (240); DEST Instance (242)/Sharepoint App 1 (244); Max Kbps (246)/500 (248); Avg Kbps (250)/100 (252); Max RTT (254)/.200 (256); Min RTT (258)/.180 (260); Avg RTT (262)/.190 (264); Count RTT (266)/5000 (268).

The systems and methods described herein add intelligence to connectivity records. Before a CR enters into the CR database, a CR is augmented with additional information. This intelligence is later needed to represent network traffic in a form useful to an organization.

The intelligence includes tagging each CR with a Source and a Destination Location.

The intelligence includes normalizing the direction of the CR and potentially reversing the CR's direction.

The intelligence includes updating the protocol name if the CR is a socket or flow based record. The intelligent application grouping method may observe traffic between CNs that reveal little information as to the nature of the connectivity. Under an embodiment, characteristics of the traffic are examined (as further described below) to associate the connectivity with a protocol.

The intelligence includes adding an Application Context to the CR to support decisions made later based on the criticality of the context.

The addition of intelligence to the Connectivity Records is further described below.

The systems and methods of an intelligent application grouping approach dynamically determines what logical locations exist with respect to an organization's CNs. Under an embodiment of the intelligent application grouping approach, these locations are referred to as physical locations—defined by logical subnets. The intelligent application grouping approach attempts to determine that 10.0.8.0/24, 10.0.9.0/24, and 10.0.10.0/24 are all sharing the same physical location (a remote office or data center). The location may be physical, but the characteristics (the subnets 10.0.X.0/24) are logical. Under an embodiment, a customer may house clusters of CNs in Phoenix, Los Angeles, New York, Datacenter1 location, Datacenter2 location, etc. In addition, locations of consumers of applications (or clients) can be grouped. This is useful in determining how many locations at a company may access a particular application. If a Connectivity Record (CR) includes an IP address, then the CR is tagged with the source and destination location of the IP address. This tagging is performed using the method described below.

Figure 3:
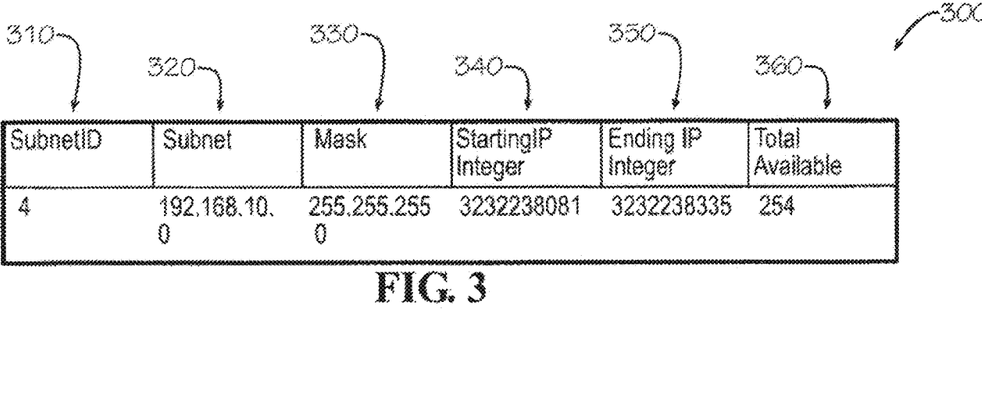
FIG. 3 shows an example of a subnet mapping, under an embodiment.

Every IPv4 address possible is mapped to a subnet in an intelligent grouping database. FIG. 3 shows an example of a subnet mapping under an embodiment. FIG. 3 shows subnet ID 310, Subnet 320, Subnet Mask 330, Starting IP Integer 340, Ending IP Integer 350, and Total Available 360 addressable spaces in the subnet. As seen in FIG. 3, subnet ID 310 comprises 4, Subnet 320 comprises 192.168.10.0, Subnet Mask 330 comprises 255.255.255.0, Starting IP Integer 340 comprises 3232238081, Ending IP Integer 350 comprises 3232238335, and Total Available 360 addressable spaces comprises 254.

Subnets records have a starting IP Integer and ending IP integer under an embodiment. These boundaries comprise numerical representations of a lower and upper limit of IPV4 addressable spaces in that subnet based on its subnet mask. The Total Available column represents the number of potential hosts in a particular subnet and results from the subtraction of Ending IP Integer from Starting IP Integer.

All IPv4 based CRs then have their Source IP address and Destination IP address converted to integers under an embodiment. A lookup is then performed to see which subnet the Source IP and Destination IP belong to by determining that (i) integer(source IP) is between a particular subnet Starting IP Integer and subnet Ending IP Integer and that (ii) integer(destination IP) is between a particular subnet Starting IP Integer and Ending IP Integer.

Ties may occur if an enterprise describes its network using overlapping subnets, e.g. a summary network and more specific network. A summary network may describe enterprise subnets available in the entire North American region. However, a more specific network may describe subnets available in the Chicago area. Clearly the Chicago network describes fewer available addressable spaces than the North American summary network. Further, the Chicago network may comprise a subset of the North American summary network. If a source or destination IP address maps to multiple networks, i.e. to subnets in multiple networks, then the address is mapped to the subnet with the lowest number of total available addresses.

Figure 4:
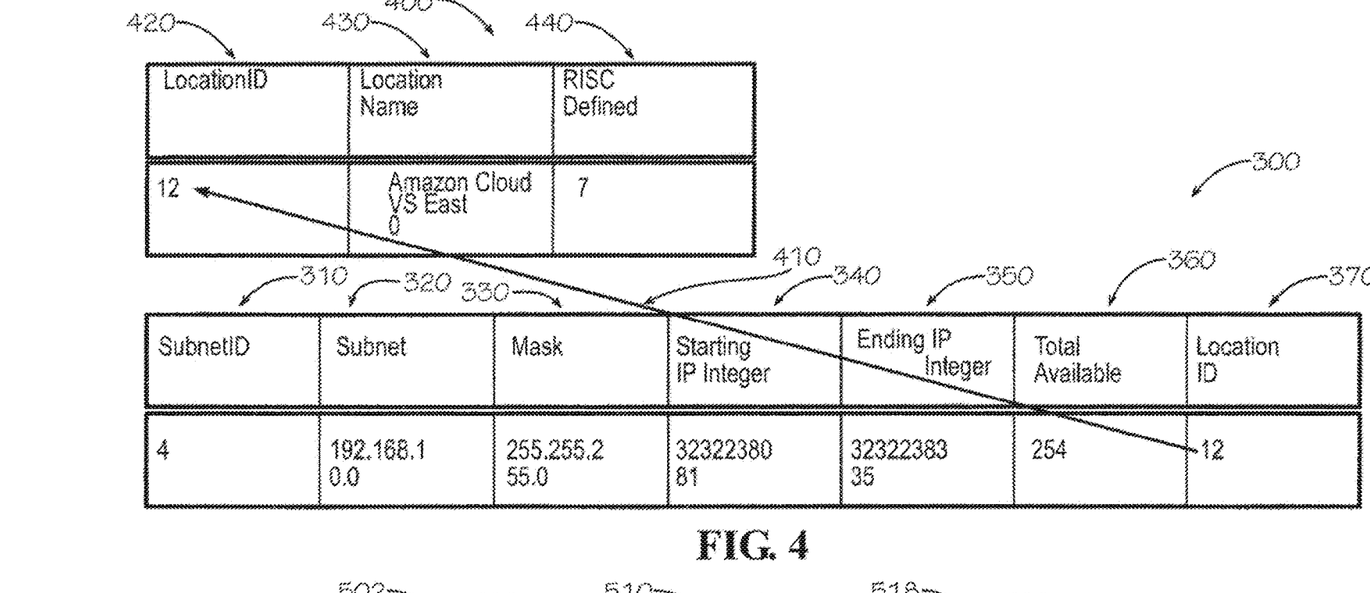
FIG. 4 shows an example of a subnet mapping, under an embodiment.

Subnets are also tied to locations. FIG. 4 again shows the subnet mapping as seen in FIG. 3. In addition, FIG. 4 shows that subnet 4 (300) is mapped 410 to LocationID 12 (420). The LocationID 420 is associated with Location Name Amazon Cloud US East (430) and RISC Defined field no. 7 (440). Under an embodiment, subnet→location mappings may be changed without updating the CR as only the subnet is tied to the CR.

The intelligent application grouping approach initially identifies locations of enterprise devices using layer 2 and layer 3 OSI information extracted from routers and switches that form the enterprise network.

Under an embodiment, intelligence added to CRs include direction information. The concept of direction is very important in determining criticality of a CR. It is important to know whether a communication provides a service or consumes a service. Therefore, it is important to determine which end of any given CR is providing a service and which end is consuming the service. Many observed CRs comprise no concept of direction. For example, a Cisco™ NetFlow™ record does not know which IP address initiated the connection. However, it is the initiator that is nearly always the consumer of the service. In order to determine who is offering a service (should be a Destination IP in a CR) and who is consuming a service (should be a Source IP In CR) on a CR, a CR is run through an intelligent directional analysis as further described below.

The directional analysis may comprise use of NetStat data under an embodiment. The network utility NetStat™ displays active TCP connections, ports on which a computer is listening. Ethernet statistics, the IP routing table, IPv4 statistics (for the IP, ICMP, TCP, and UDP protocols), and IPV6 statistics (for the IPV6, ICMPv6, TCP over IPv6, and UDP over IPv6 protocols). Used without parameters, NetStat displays active TCP connections.

First, using NetStat, the intelligent application grouping method/approach builds a table (called the Offered Services table) This table tracks CNs that are holding open sockets in a "listening" state for a particular process/application. The corresponding listening port number and time interval are also recorded. When any CR is processed, the directional analysis checks to see if either the source or destination IP of the CR corresponds to a CN IP address in the Offered Services table known (based on the Offered Services data) to offer a service on the same port at the same time (i.e. matching a port/time/address of the CR communication). If the source IP addresses matches (but not the destination IP), then the CR is corrected to show the source IP address as the destination. If the destination IP addresses matches (but not the source IP), then no correction is made. If both the source and destination IP are in the table (or if neither are in the able), the CR is not changed.

The Observed Services table solves a directionality problem of flow records under an embodiment. As indicated above, CR flow records (e.g. Cisco™ NetFlow™ records) lack information regarding client/server orientation. For example, a CR may indicate a communication between CN A and CN B on a particular port. However, the CR does not indicate which IP address actually initiated the communication, i.e. which IP address functions as the client and which IP address offers a service. In order to assess directionality, the source IP address and the destination IP address of the CR are compared to the Offered Services table. As one example, the source IP address may match a CN address in the Offered Services table that offers a service at a time and on a port matching the time and port of the CR communication. If there is a match, then the source IP is then corrected to be the destination address offering a service.

Matches do not always occur at the level of an exact or nearly exact correspondence between time of the CR and time of an offered service on a CN. For example, flow records may aggregate over a period of time, e.g. a thirty minute time interval. In this case, a different priority or confidence level is used to determine directionality. During a particular time interval (including the time of the CR), the Offered Services table may indicate that a CN (matching a CR source or destination IP address) is known to offer a TCP/IP service on port 80 every time the device is polled during such interval. Therefore, there is confidence concerning directionality due to the fact that the CN always behaves the same way during the time interval, i.e. always offers the same service on the same port.

In lieu of NetStat, or any way to populate Offered Services, a separate table tracks the number of times that a particular CN is seen communicating on the same port. These communications are sorted, and the top 5% are assumed to be offering a service and are treated just like Offered Services. This data is not used if NetStat is available for a particular CN.

Intelligence data added to a CR includes a protocol name under an embodiment. A communications protocol comprises a system of rules that allow two or more entities of a communications system to transmit information. The protocol comprises the rules or standards that define the syntax, semantics and synchronization of communications and possible error recovery methods. Protocols may be implemented by hardware, software, or a combination of both. Protocols are associated with ports. In computer networking, a port is an endpoint of communication in an operating system. While the term is also used for hardware devices, in software it is a logical construct that identifies a specific process or a type of service. A port is associated with an IP address of a host and the protocol type of the communication. A port thus completes the destination or origination address of a communication session. A port is identified for each address and protocol by a 16-bit number, commonly known as the port number. Specific port numbers are often used to identify specific services. Of the thousands of enumerated ports, 1024 well-known port numbers are reserved by convention to identify specific service types on a host.

Accordingly, certain well-known ports may be used to determine a protocol. For example, the HTTP protocol uses TCP Port 80. In many cases, however, CNs use non-standard or vendor defined ports for communication. In this case, an intelligent application grouping method inspects the process running on a particular CN to create the Connectivity Record. This process is then mapped to a table curated for the purpose of tying processes to protocol names. Under an embodiment, this the same method described below that is used to marry a process to a CR.

Figure 5:
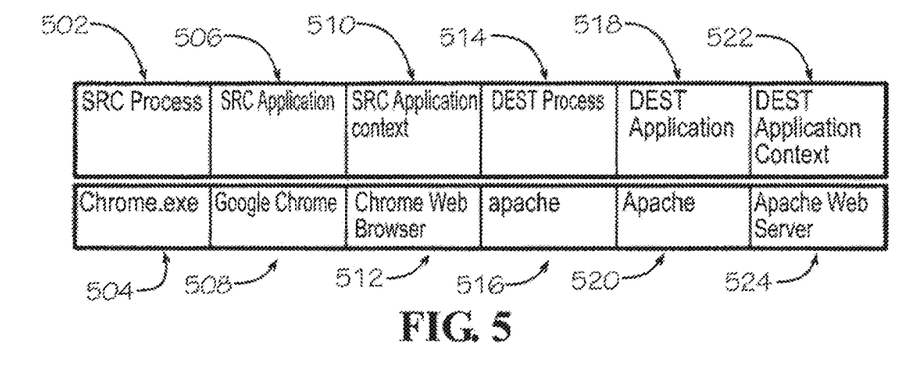
FIG. 5 shows application context information, under an embodiment.

The intelligent application grouping method then adds an application context. An application context is a term used to describe the high level application used to generate a Connectivity Record. For example, if you open a web browser to consume a web page, the client/server Application Context would correspond to the CR application information set forth in FIG. 5. FIG. 5 shows the following field/value combinations: SRC Process 502/Chrome.exe 504, SRC Application 506/Google Chrome 508, SRC Application Context 510/Chrome Web Browser 512, Dest Process 514/Apache 516, Dest Application 518/Apache 520, Dest Application Context 522/Apache Web Server 524.

In order to establish the application context, NetStat is used under an embodiment to collect the process ID (source and destination) that is controlling a socket connection. This processID is then cross referenced to the list of processes on that particular CN. This step provides the CR the process name, process runpath, and any process command-line variables with respect to that particular CN. An embodiment of the systems and method described herein queries CNs to get a list of process names/runpath/command line variable along with corresponding times and process IDs.[1] It should be noted that NetStat provides both connectivity records and process ID (which then may itself be used to identify the list of processes running on a particular CN). However, the intelligent application grouping must then marry process to the CR. The process ID leads to the process name, process runpath, and process command line variable running on a particular CN. This information is matched to a CR if the process and command line variables were running at the time the CR is collected. Under an embodiment, this is a time match in a manner analogous to offered services. The intelligent application grouping method then cross references these data points (process name, process runpath, and process command line variable) to another table (maintained by an intelligent application grouping embodiment) that maps these three variables (process name, process runpath, and process command-line variables) to defined application contexts. These contexts are then applied to the CR. This application context processing is performed for both the source and destination directions simultaneously.

[1] Each operating system manage process identification numbers differently: Windows vs. Linux.

The intelligent application grouping organizes communications data of an enterprise network as a connectivity records (CRs) augmented with intelligence data. FIG. 2 shows a completed connectivity record (CR) under an embodiment. FIG. 2 shows the following field/value combinations: SourceIP (202)/10.0.0.1 (204); DestIP (206)/192.168.10.30 (208); SourceLoc (210)/Dallas (212); DestLoc (214)/Omaha (216); ProtocolName (218)/mysql (220); SRC Process (222)/Mysqld.exe (224); SRC Application Context (226)/Oracle MySQL (228); SRC Instance (230)/Database1 (232); DEST Process (234)/W3. exe (236); DEST Application Context (238)/Microsoft IIS (240); DEST Instance (242)/Sharepoint App 1 (244); Max Kbps (246)/500 (248); Avg Kbps (250)/100 (252); Max RTT (254)/.200 (256); Min RTT (258)/.180 (260); Avg RTT (262)/.190 (264); Count RTT (266)/5000 (268).

Difficulties arise due to the volume of CRs collected. The intelligent application grouping method of an embodiment collects many millions of CRs. In fact up to 20 Million new CRs per day for a customer may easily be collected. If analysis of CR data simply worked upon the assumption that all CRs are important and should be used to group applications, analysis would essentially identify one giant application across all CNs of an enterprise.

In enterprise environments, there are many "services" that are offered to the CNs. These services include DNS (Domain Name Service), Active Directory, and Anti-virus, Backup services, Package distribution services, network monitoring platforms, etc. There are many other analogous services. In many cases, CNs from many different applications use these same services. Under one embodiment, CNs may use services through one or more intermediary CNs. Accordingly, the very architecture of an enterprise network causes any connectivity graph built on CRs to show that all of these applications are actually connected to each other. Although true in a sense, this type of connectivity does not constitute a dependency of concern to an organization.

Figure 6:
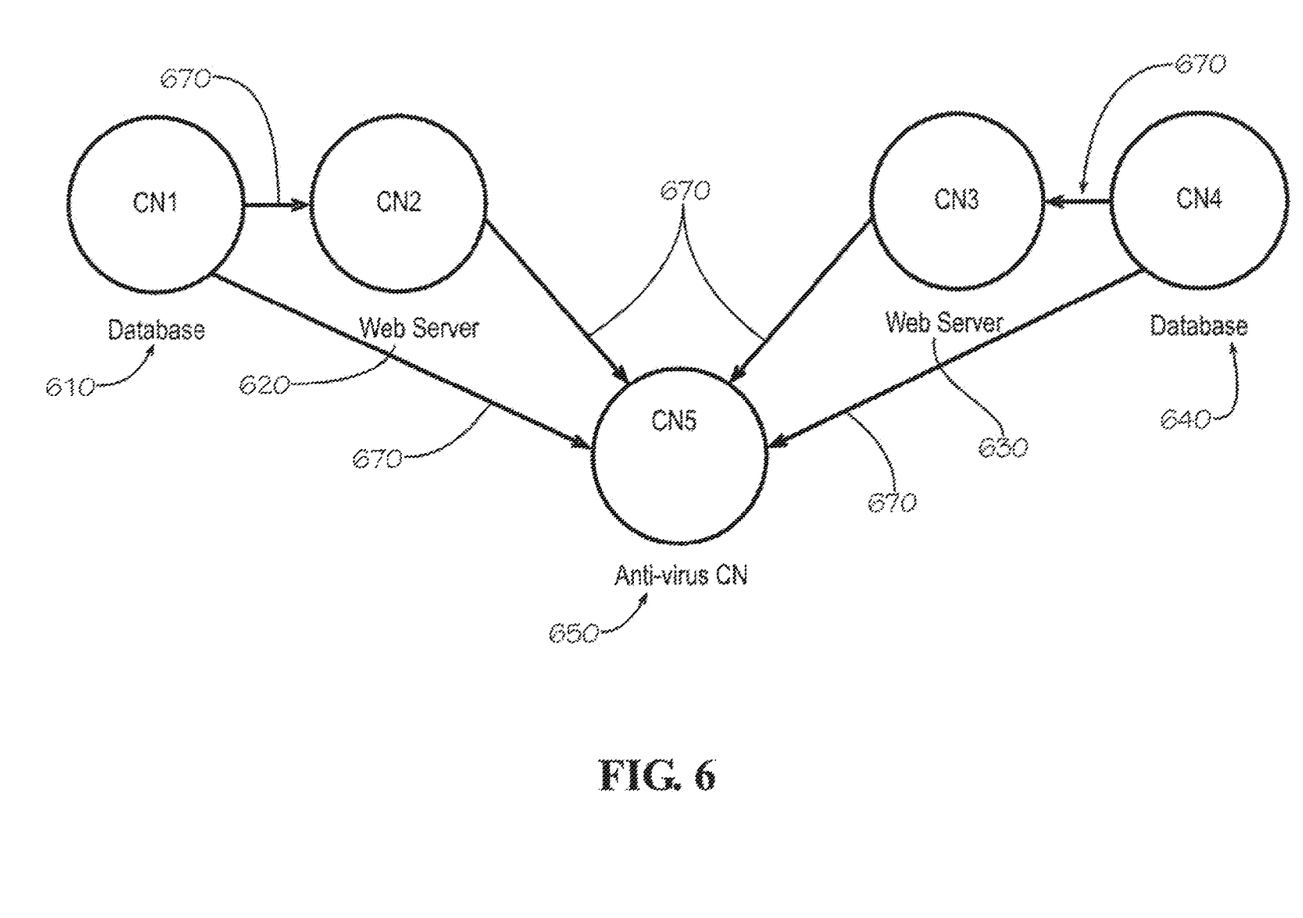
FIG. 6 shows enterprise network connectivity, under an embodiment.

FIG. 6 shows database 610 and web server 620. FIG. 6 also shows database 640 and web server 630. Finally, FIG. 6 shows an anti-virus CN 650 offering an anti-virus service. If you assume all the CRs 670 are important, and also use CRs to group applications, then this collection of database servers, web servers and anti-virus CN is one application.

Figure 7:
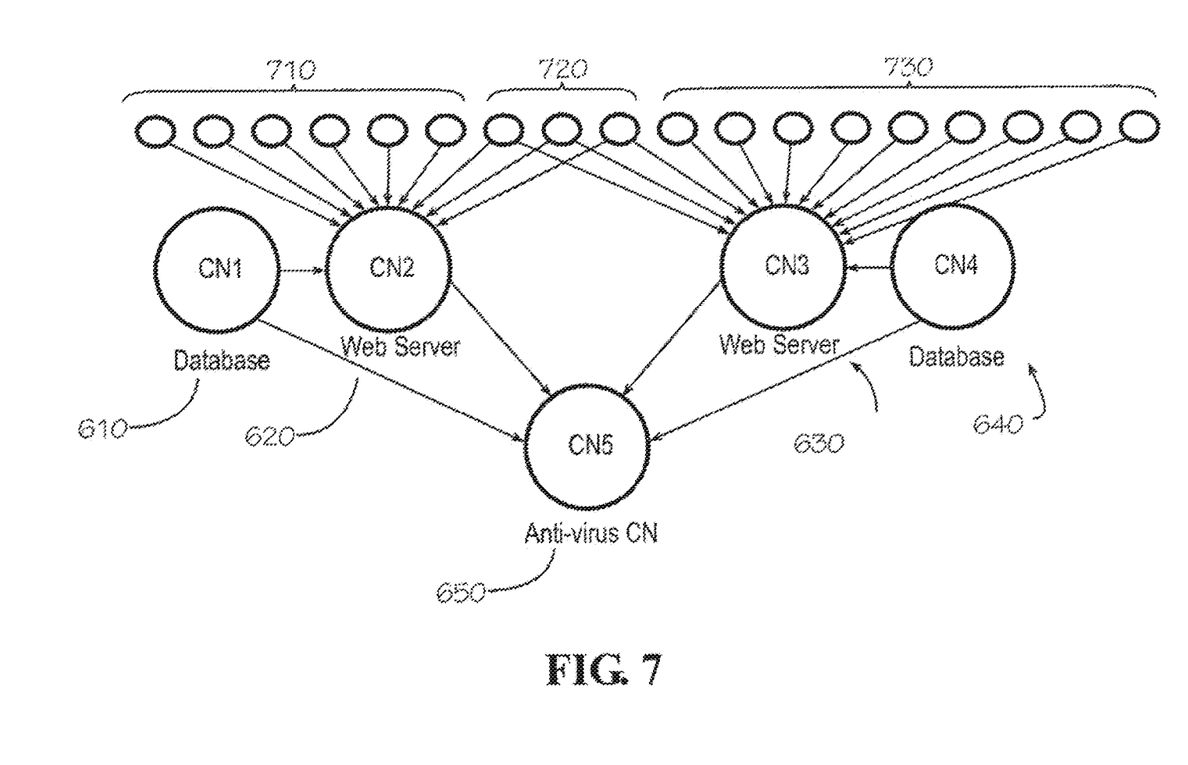
FIG. 7 shows enterprise network connectivity, under an embodiment.

However, there are thousands of CN clients in an enterprise environment that may "touch" the Anti-virus application environment of FIG. 6. As seen in FIG. 7, a first set of CNs 710 communicate with web server 620 through a first set of CRs. A second set of CNs 730 communicate with web server 630 through a second set of CRs. A third set of CNs 720 communicate with both web servers 620, 630 through a third set of CRs. Because the web servers of FIG. 7 have thousands of clients, they all look like they are part of the application as well. These CNs may wind up joining the stacks.

Under an embodiment, the "intelligence" data added to the CRs is used to solve the one application problem. The solution is multifold. First, create "Service Oriented Architecture" (SOA) groups to identify/house services like an Anti-Virus service. Second, prevent links into SOAs from joining other nodes together. Third, process rules on remaining CRs to prevent them from being identified as critical.

Figure 8:
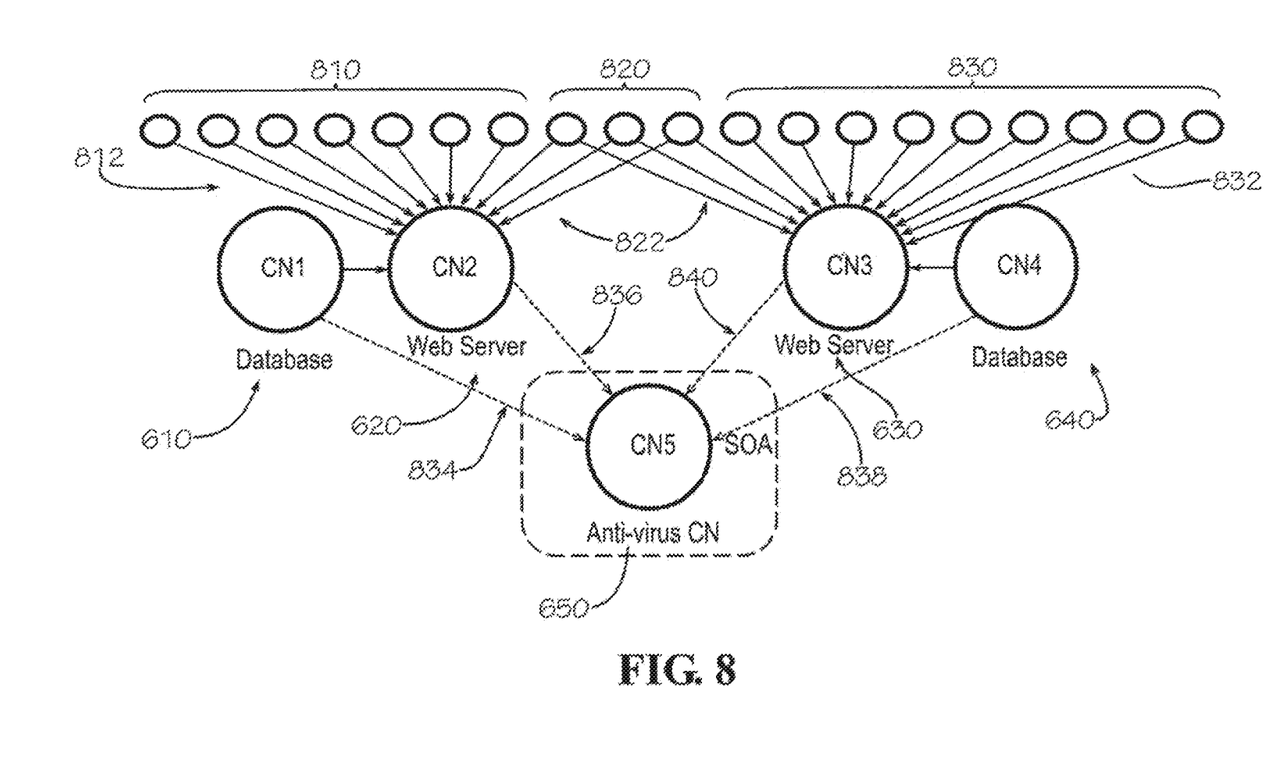
FIG. 8 shows enterprise network connectivity, under an embodiment.

FIG. 8 again shows database 610 and web server 620. FIG. 8 also shows database 640 and web server 630. Finally, FIG. 8 shows an anti-virus CN 650 offering an anti-virus service.

Figure 9:
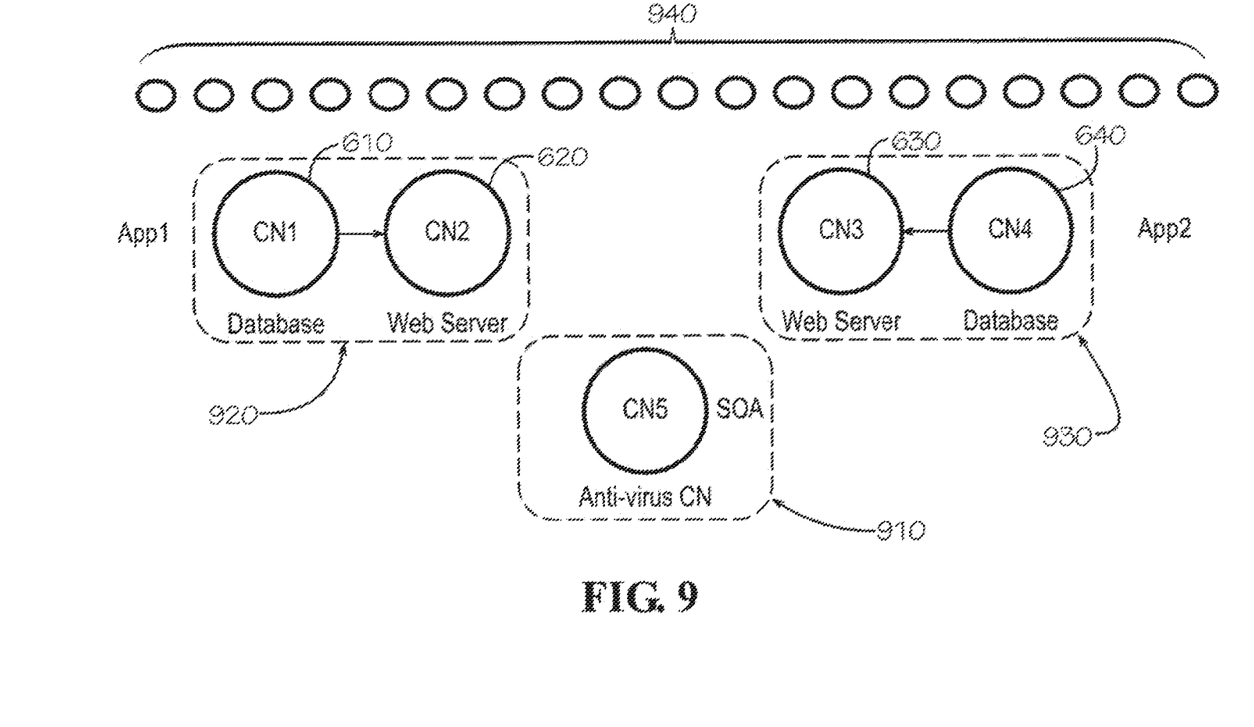
FIG. 9 shows isolated applications, under an embodiment.

Continuing with reference to FIG. 8, a first set of clients 810 communicate with web server 620 through a first set of CRs 812. A second set of clients 830 communicate with web server 630 through a second set of CRs 832. A third set of clients 820 communicate with both web servers 620, 630 through a third set of CRs 822. Database 610 and web server 620 communicate with the Anti-virus CN 650 through CRs 834, 836. Database 640 and web server 630 communicate with the Anti-virus CN 650 through CRs 838, 840. Once CRs 812, 822, 832, 834, 836, 838, 840 as shown in FIG. 8 are identified and eliminated from a CR graph, a breadth first or depth first traversal can be executed to find all attached nodes FIG. 9 shows the result of this traversal. The result is one service oriented architecture application 910, two other "applications" (App1 920 comprising database 610 and web server 620 and App2 comprising database 640 and web server 630), and a host of clients 940. The applications are easily seen. The applications still communicate to the Anti-virus SOA. As described further below, this connectivity will be visible to a customer but is not used to identify the groupings under an embodiment.

The intelligent application grouping analysis proceeds in four general steps in order to solve the one application problem, i.e. distill on giant application into a reduced number of meaningful applications. First, the intelligent application grouping analysis identifies the service oriented architectures in the enterprise network environment. Second, the intelligent application grouping analysis adds service oriented architecture CNs to service oriented architecture groups. Third, the intelligent application grouping analysis grabs all "intelligence augmented" CRs from the database with corresponding metadata. Fourth, the intelligent application grouping analysis builds a graph using the CRs, but only after they have been passed through a set of rules evaluating each CR.

Identifying Service Oriented Architectures (SOAs) (Steps 1 and 2)

The intelligent application grouping process maintains a database of SOA offerings that are updated on a regular basis. The Offered Services table is utilized to identify hosts in a customer environment that match these SOA applications. The matching is performed on a process (.exe) basis under an embodiment. The intelligent application grouping process may also identify SOAs using statistical analysis. For example, it may be assumed that the top five percent of connected hosts in an environment offer shared services. This five percent may then be pulled out into a special SOA for modeling. According, statistical analysis may uncover previously unknown SOA groups. A group is then created in a database for each SOA. Different applications may offer a similar or common service and may therefore belong to an SOA group. A mapping is then created for each CN of an enterprise to each SOA group.

Pull Connectivity Records From Database (step 3)

The intelligent application grouping process retrieves all CRs from the database comprising the CRs with "intelligent" metadata. Under an embodiment, millions of CRs are pulled from the database and cross referenced with group membership information. This query retrieves membership information with respect to all CRs. Under an embodiment, this analysis identifies CR group membership. A particular CR may reference a CN that is in an SOA group and one CN that is not in an SOA group. Or perhaps the CR references two CNs both of which are in a group. Or perhaps the CR references CNs belonging to no group. At this point the intelligent application grouping process (i) cross references CRs to determine device type of CNs and (ii) cross references CRs to determine licensing status of CNs.

Build a Graph (Step 4)

The intelligent application grouping process then builds a graph using CRs and their corresponding metadata information. The graph comprises a connected, directional graph under an embodiment. The graph may be built and then processed. Alternatively, the graph may be processed as it is built. Each CR is added to the graph as an edge under an embodiment. The associated CNs are then added as vertices. The CR is only added if it passes rules described in greater detail below. The rules prevents the graph from containing unwanted edges.

The Connectivity Record Rule Set includes a primary rule and secondary rules.

A primary rule under an embodiment comprises . . .
If either CN in a CR is already in a group, do not add it to the graph.
This rules eliminates the SOA groups from the graph and prevents two stacks from joining through them in the traversal.

Secondary rules under an embodiment process the application contexts of CRs to determine their criticality based on a set of rules. Certain CRs are then eliminated if they are deemed non-critical. For example, an application context may be eliminated if the application context matches at least one of a non-critical set of applications.

Now that the graph is built, a breadth first or depth first traversal may yield connected subgraphs. These subgraphs are then iterated to identify the applications. Under an embodiment, the graph that is built to do the traversal does not house SOAs. However, this graph is transient under an embodiment and may be destroyed once the groups are defined and stored in a relational database table. Later when a user views the applications, the user sees the applications as defined in the relational table. If connectivity records are viewed, a user may go back to the full data set of all records (also housed in a relational table). The graph is under an embodiment is instantiated briefly.

Figure 10:
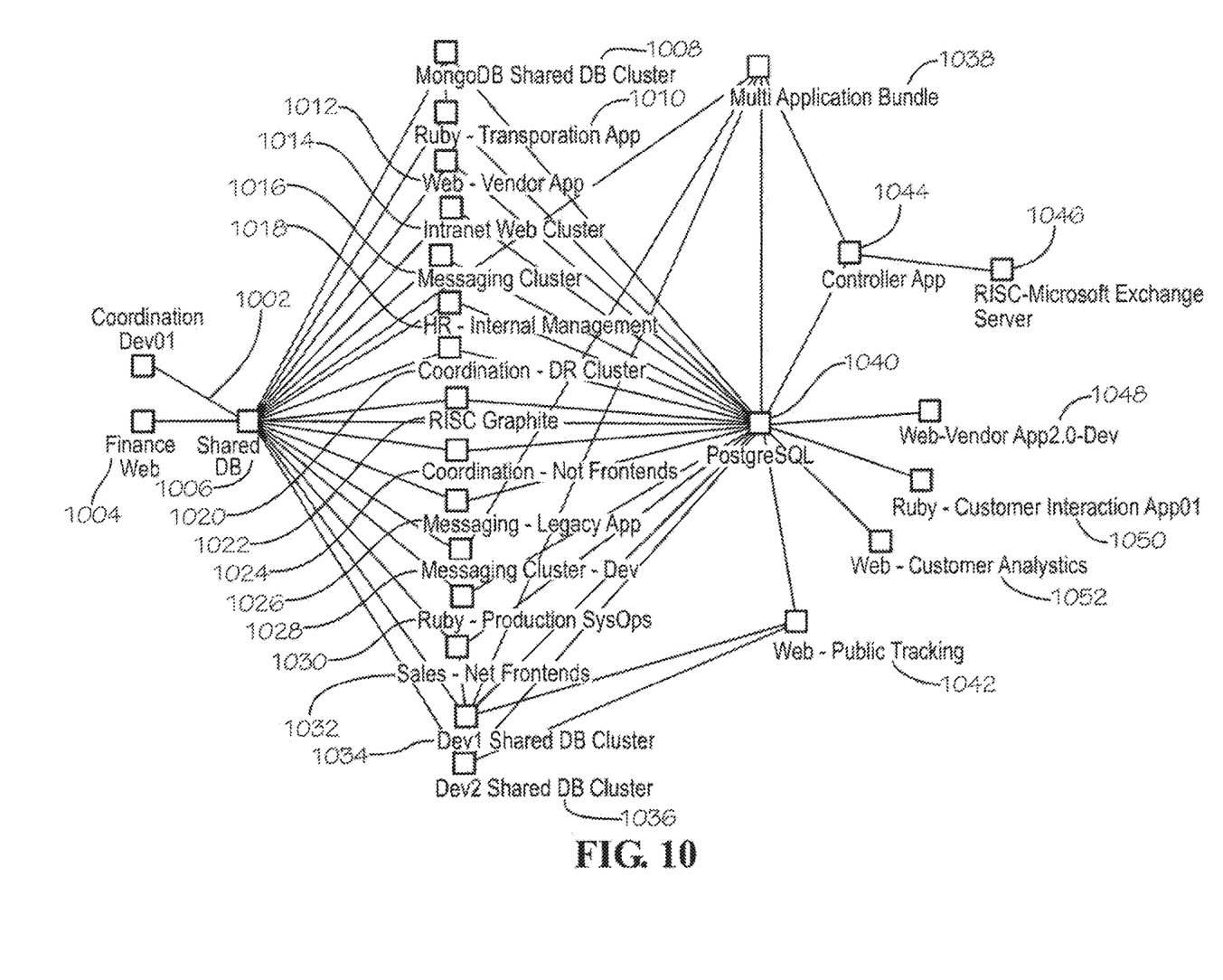
FIG. 10 shows a graph of enterprise applications, under an embodiment.

FIG. 10 shows a graph of enterprise applications after implementation of the intelligent application grouping analysis. FIG. 10 shows the following applications: Coordination—Dev01 1002, Finance Web 1004, Shared DB 1006, Mongo DB 1008, Ruby—Transportation App 1010, Web—Vendor App 1012, Intranet Web Cluster 1014, Messaging Cluster 1016, HR—Internal Management 1018, Coordination—DR Cluster 1020, RISC—Graphite 1022, Coordination—.Net Frontends 1024, Messaging—Legacy App 1026, Messaging Cluster—Dev 1028, Ruby—Production SysOps 1030, Sales—.NET Frontends 1032, Dev1 Shared DB Cluster 1034, Dev2 Shared DB Cluster 1036, Multi Application Bundle 1038, PostgreSQL 1040, Web—Public Tracking 1042, Controller App 1044, RISC—Microsoft Exchange Server 1046, Web—Vendor App 2.0—Dev 1048, Ruby—Customer Interaction App01 1050, and Web—Customer Analytics 1052

Note the FIG. 10 does not display SOA service group hosts.

Each communication link between applications as seen in FIG. 10 may be designated as critical or not critical. Further, links may also indicate whether certain applications are licensed.

Figure 11:
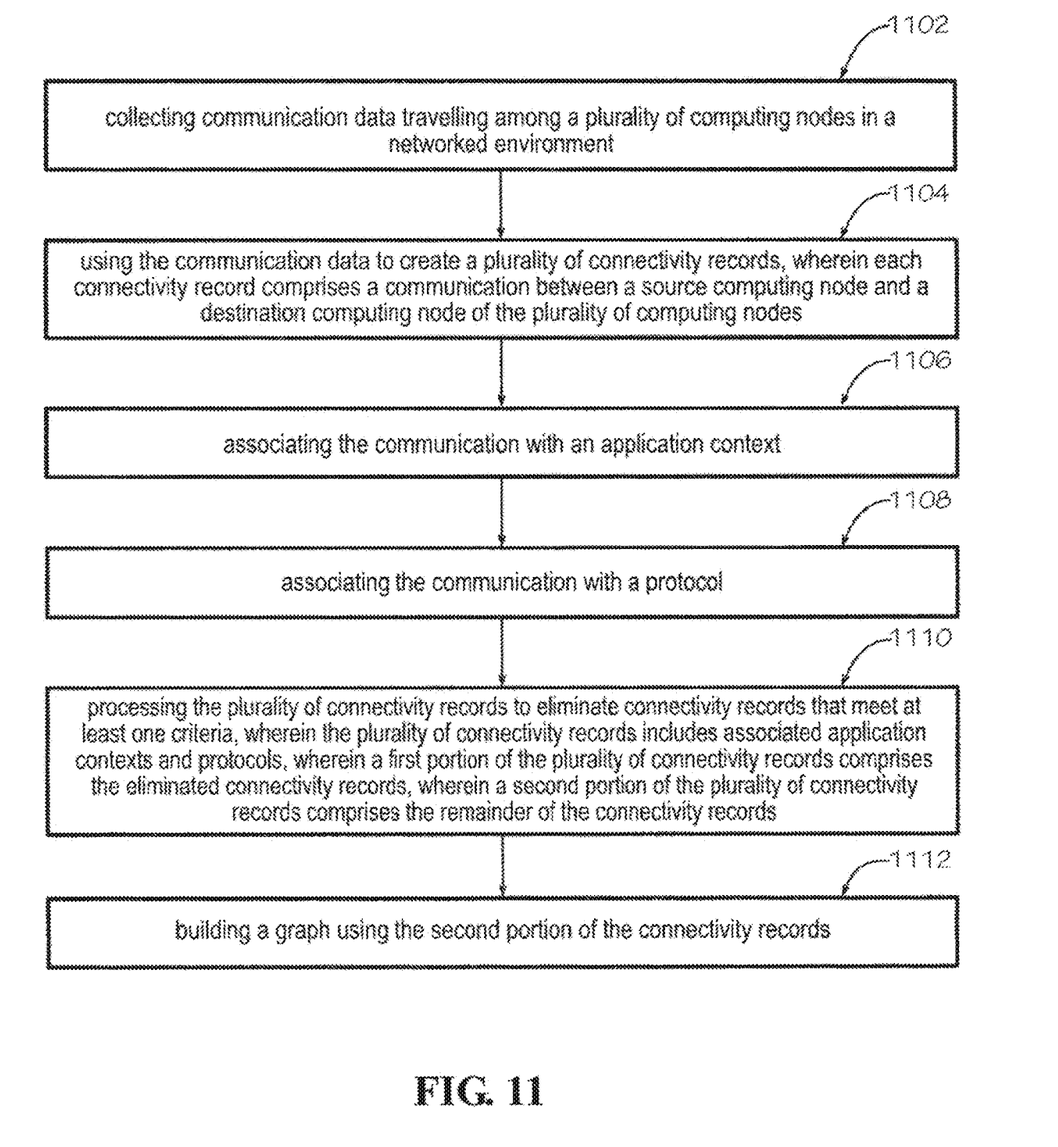
FIG. 11 shows a method for intelligently organizing applications in a networked environment, under an embodiment.

FIG. 11 shows a method for intelligently organizing applications in a networked environment, under an embodiment. The method includes 1102 collecting communication data travelling among a plurality of computing nodes in a networked environment. The method includes 1104 using the communication data to create a plurality of connectivity records, wherein each connectivity record comprises a communication between a source computing node and a destination computing node of the plurality of computing nodes. The method includes 1106 associating the communication with an application context. The method includes 1108 associating the communication with a protocol. The method includes 1110 processing the plurality of connectivity records to eliminate connectivity records that meet at least one criteria, wherein the plurality of connectivity records includes associated application contexts and protocols, wherein a first portion of the plurality of connectivity records comprises the eliminated connectivity records, wherein a second portion of the plurality of connectivity records comprises the remainder of the connectivity records. The method includes 1112 building a graph using the second portion of the connectivity records.

A method is described herein that comprises collecting communication data travelling among a plurality of computing nodes in a networked environment. The method includes using the communication data to create a plurality of connectivity records, wherein each connectivity record comprises a communication between a source computing node and a destination computing node of the plurality of computing nodes. The method includes associating the communication with an application context. The method includes associating the communication with a protocol. The method includes processing the plurality of connectivity records to eliminate connectivity records that meet at least one criteria, wherein the plurality of connectivity records includes associated application contexts and protocols, wherein a first portion of the plurality of connectivity records comprises the eliminated connectivity records, wherein a second portion of the plurality of connectivity records comprises the remainder of the connectivity records. The method includes building a graph using the second portion of the connectivity records.

The collecting the communication data includes using a network utility to capture the communication data, under an embodiment.

The network utility comprises NetStat™ under an embodiment.

The network utility comprises NetFlow™ under an embodiment.

The network utility comprises a packet sniffing utility under an embodiment.

The collecting the communication data includes under an embodiment examining configuration defined communications, wherein the configuration defined communications include application dependencies.

The collecting the communication data includes under an embodiment examining error log based communication definitions.

The collecting the communication data includes using API defined queries.

The communication data comprises IPv4 datagrams under an embodiment.

The communication comprises a source IP address of the source computing node, under an embodiment.

The communication comprises a destination IP address of the destination computing node, under an embodiment.

The networked environment comprises subnets, under an embodiment.

Subnet records provide under an embodiment a numerical representation of a lower limit and upper limit of addressable space in each subnet of the networked environment.

The lower limit of addressable space in each subnet comprises a starting IP integer, under an embodiment.

The upper limit of addressable space in each subnet comprises an ending IP integer, under an embodiment.

The method includes converting the source IP address of the communication to a source integer, under an embodiment.

The method includes converting the destination IP address of the communication to a destination integer, under an embodiment.

The method includes under an embodiment assigning membership of the source IP address to a subnet if the source integer is greater than or equal to the subnet's starting IP integer and less than or equal to the subnet's ending IP integer.

The method includes under an embodiment assigning membership of the destination IP address to a subnet if the destination integer is greater than or equal to the subnet's starting IP integer and less than or equal to the subnet's ending IP integer.

The method incudes mapping each subnet of the networked environment to at least one location, under an embodiment.

The associating the communication with a protocol includes identifying the protocol using a port number associated with the communication, under an embodiment.

The communication includes a process identification number, under an embodiment.

The communication comprises a socket connection controlling the communication, under an embodiment.

The communication comprises a time of occurrence, under an embodiment.

The communication comprises a duration, under an embodiment.

The associating the communication with an application context includes querying the source computing node to identify source processes running on the source computing node at the time of occurrence, under an embodiment.

The associating the communication with an application context includes querying the destination computing node to identify destination processes running on the destination computing node at the time of occurrence, under an embodiment.

The method includes under an embodiment using the process identification number to identify a source process corresponding to the communication.

The method includes using the process identification number to identify a destination process corresponding to the communication, under an embodiment.

The source process and the destination process each include under an embodiment one or more of a process name, process runpath and process command line variables.

The method includes under an embodiment using an association between defined application contexts and one or more of process name, process runpath and process command line variables to associate the communication with a source application context and a destination application context, wherein the application context includes the source application context and the destination application context.

The method includes under an embodiment using an association between defined protocols and processes to associate the source process with a source protocol and the destination process with a destination protocol, wherein the protocol includes the source protocol and the destination protocol.

The method includes under an embodiment defining a plurality of service oriented architecture groups, wherein a service oriented architecture group comprises one or more computing nodes of the plurality of computing nodes that run a service oriented architecture application.

A service oriented architecture application provides a network service to client computing nodes in the networked environment, under an embodiment.

The network service includes under an embodiment one or more of Domain Name Service, Active Directory, antivirus, backup, package distribution, and network monitoring.

The defining the plurality of service oriented architecture groups includes under an embodiment querying the plurality of computing nodes to determine whether a computing node runs a service oriented architecture application.

The processing includes under an embodiment examining each CR of the plurality of connectivity records to determine whether the at least one criteria is met.

The at least one criterion includes under an embodiment a source IP address of a connectivity record of the plurality of connectivity records matching a computing node belonging to a service oriented architecture group.

The at least one criterion includes under an embodiment a destination IP address of a connectivity record of the plurality of connectivity records matching a computing node belonging to a service oriented architecture group.

The at least one criterion includes under an embodiment the application context matching at least one of a non-critical set of applications.

The method includes iterating the second portion of the connectivity records to identify subgraphs of the graph, under an embodiment.

Each subgraph comprises under an embodiment connectivity records of the plurality of connectivity records that represent connectivity between a corresponding discrete subset of the plurality of computing nodes.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for providing intelligent application grouping can be a component of a single system, multiple systems, and/or geographically separate systems. The systems and methods for providing intelligent application grouping can also be a subcomponent or subsystem of a single system, multiple systems, and/or geographically separate systems. The components of the systems and methods for providing intelligent application grouping can be coupled to one or more other components (not shown) of a host system or a system coupled to the host system.

One or more components of the systems and methods for providing intelligent application grouping and/or a corresponding interface, system or application to which the systems and methods for providing intelligent application grouping is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, a i phone, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods for providing intelligent application grouping can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or back-end networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for providing intelligent application grouping and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods for providing intelligent application grouping and corresponding systems and methods include: microcontrollers with memory (such as electronically erasable programmable read only memory (EEPROM)), embedded microprocessors, firmware, software, etc. Furthermore, aspects of the systems and methods for providing intelligent application grouping and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP. FTP. SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising." and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder." "above." "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for providing intelligent application grouping is not intended to be exhaustive or to limit the systems and methods to the precise forms disclosed. While specific embodiments of, and examples for, the systems and methods for providing intelligent application grouping and corresponding systems and methods are described herein for illustrative purposes, various equivalent modifications are possible within the scope of the systems and methods, as those skilled in the relevant art will recognize. The teachings of the systems and methods for providing intelligent application grouping and corresponding systems and methods provided herein can be applied to other systems and methods, not only for the systems and methods described above.

The elements and acts of the various embodiments described above can be combined to provide further embodiments. These and other changes can be made to the systems and methods for providing intelligent application grouping and corresponding systems and methods in light of the above detailed description.

The invention claimed is:

1. A computer-implemented method comprising:
under control of a computing system comprising one or more computing devices configured to execute specific instructions,
collecting communication data regarding communications among a plurality of computing nodes in a networked environment;
creating a plurality of connectivity records from the communication data, wherein each connectivity record of the plurality of connectivity records represents a communication between a source computing node and a destination computing node of the plurality of computing nodes;
generating cross-reference data based on the plurality of connectivity records cross-referenced with service oriented architecture group membership information for corresponding computing nodes associated with the plurality of connectivity records;
determining device types for the corresponding computing nodes associated with the plurality of connectivity records based at least partly on the cross-reference data;
identifying a plurality of applications of the networked environment based at least partly on device types for individual computing nodes associated with the plurality of connectivity records; and
generating a graph of the networked environment based at least partly on the identifying the plurality of applications, wherein the graph comprises a plurality of vertices corresponding to the plurality of applications.

2. The computer-implemented method of claim 1, wherein creating the plurality of connectivity records from the communication data comprises creating the plurality of connectivity records from portions of the communication data that satisfy a criterion.

3. The computer-implemented method of claim 1, wherein generating the graph comprises including, in the graph, a plurality of edges representing communication links between applications.

4. The computer-implemented method of claim 3, wherein generating the graph comprises including, in the graph, an edge that designates whether a communication link is critical or non-critical.

5. The computer-implemented method of claim 3, wherein generating the graph comprises including, in the graph, an edge that designates whether an application is licensed or unlicensed.

6. The computer-implemented method of claim 1, wherein creating the plurality of connectivity records from the communication data comprises creating a first connectivity record using a first communication which comprises a source IP address of a first source computing node and a destination IP address of a first destination computing node.

7. The computer-implemented method of claim 6, further comprising associating the first communication with an application context.

8. The computer-implemented method of claim 7, further comprising associating the first communication with a protocol.

9. The computer-implemented method of claim 1, further comprising determining to exclude a service orientated architecture application from a set of applications represented by vertices of the graph.

10. A system comprising:
computer-readable memory storing executable instructions; and
one or more processors in communication with the computer-readable memory and configured by the executable instructions to at least:
collect communication data regarding communications among a plurality of computing nodes in a networked environment;
create a plurality of connectivity records from the communication data, wherein each connectivity record of the plurality of connectivity records represents a communication between a source computing node and a destination computing node of the plurality of computing nodes;
generate cross-reference data based on the plurality of connectivity records cross-referenced with service oriented architecture group membership information for corresponding computing nodes associated with the plurality of connectivity records;
determine device types for the corresponding computing nodes associated with the plurality of connectivity records based at least partly on the cross-reference data;
identify a plurality of applications of the networked environment based at least partly on device types for individual computing nodes associated with the plurality of connectivity records; and
generate a graph of the networked environment in response to identifying the plurality of applications, wherein the graph comprises a plurality of vertices corresponding to the plurality of applications.

11. The system of claim 10, wherein to create the plurality of connectivity records from the communication data, the one or more processors are further configured by the executable instructions to create the plurality of connectivity records from portions of the communication data that satisfy a criterion.

12. The system of claim 10, wherein the graph comprises a plurality of edges representing communication links between applications.

13. The system of claim 12, wherein the graph comprises an edge that designates whether a communication link is critical or non-critical.

14. The system of claim 12, wherein the graph comprises an edge that designates whether an application is licensed or unlicensed.

15. The system of claim 10, wherein to create the plurality of connectivity records from the communication data, the one or more processors are further configured by the executable instructions to create a first connectivity record using a first communication which comprises a source IP address of a first source computing node and a destination IP address of a first destination computing node.

16. The system of claim 15, wherein the one or more processors are further configured by executable instructions to associate the first communication with an application context.

17. The system of claim 16, wherein the one or more processors are further configured by executable instructions to associate the first communication with a protocol.

18. The system of claim 10, wherein the one or more processors are further configured by executable instructions to exclude a service orientated architecture application from a set of applications represented by vertices of the graph.

* * * * *